(12) United States Patent
Gipson

(10) Patent No.: US 6,930,148 B2
(45) Date of Patent: *Aug. 16, 2005

(54) ENHANCED POLYISOBUTYLENE MODIFIED HOT MELT ADHESIVE FORMULATION

(75) Inventor: Betty L. Gipson, League City, TX (US)

(73) Assignee: Texas Petrochemicals LP, Houston, TX (US)

(*) Notice: Subject to any disclaimer, the term of this patent is extended or adjusted under 35 U.S.C. 154(b) by 45 days.

This patent is subject to a terminal disclaimer.

(21) Appl. No.: 10/409,203

(22) Filed: Apr. 8, 2003

(65) Prior Publication Data

US 2004/0204529 A1 Oct. 14, 2004

(51) Int. Cl.[7] .............................. C08F 8/00; C08L 9/00; C08L 23/00; C08L 23/04; C08L 25/02
(52) U.S. Cl. ..................... 525/191; 525/232; 525/240; 525/241
(58) Field of Search ................................ 525/191, 232, 525/240, 241

(56) References Cited

U.S. PATENT DOCUMENTS

| | | | | |
|---|---|---|---|---|
| 3,932,563 A | * | 1/1976 | Argurio et al. | 428/220 |
| 4,022,728 A | * | 5/1977 | Trotter et al. | 524/528 |
| 4,977,206 A | * | 12/1990 | Hwo et al. | 524/504 |
| 5,163,976 A | * | 11/1992 | Ravipati et al. | 51/295 |
| 6,096,435 A | * | 8/2000 | Maekawa et al. | 428/462 |
| 6,730,739 B2 | * | 5/2004 | Gipson | 525/191 |
| 6,777,502 B2 | * | 8/2004 | Ho et al. | 525/332.6 |
| 6,846,893 B1 | * | 1/2005 | Sherman et al. | 528/28 |

* cited by examiner

*Primary Examiner*—Nathan M. Nutter
(74) *Attorney, Agent, or Firm*—James H. Marsh, Jr.; Stinson Morrison Hecker LLP

(57) ABSTRACT

An improved hot melt adhesive includes a base polymer and a PIB modifier that is made up of a homopolymer of isobutylene wherein a predominant portion of the double bonds are in either an alpha position or a beta position. The modifier may function to improve the loop tack and/or the peel adhesion of the hot melt adhesive.

41 Claims, 2 Drawing Sheets

ENHANCED POLYISOBUTYLENE MODIFIED HOT MELT ADHESIVE FORMULATION

CROSS REFERENCE TO RELATED APPLICATION

None

BACKGROUND OF THE INVENTION

1. Field of the Invention

The present invention relates to hot melt adhesives and the like, and in particular to plasticizers and tackifier extenders for hot melt adhesives. More particularly the invention relates to improved hot melt adhesives that incorporate enhanced polyisobutylene (PIB) modifiers therein. The invention also relates to methods for improving the peel strength and tack strength of hot melt adhesives by incorporating therein an enhanced PIB modifier.

2. The Prior Art Background

Hot melt adhesives are well known products having many uses, including, for example, and without limitation, use in connection with packaging, woodworking, and bookbinding. Generally speaking, hot melt adhesives are thermoplastic polymer based adhesives. These adhesives are conventionally applied in the molten state, usually at temperatures in the range of about 250° F. Hot melt adhesives typically function by mechanical anchorage to bind two or more objects together.

It is known that the adhesive properties of hot melt adhesives may be improved and enhanced by the incorporation therein of modifiers such as plasticizers and tackifier extenders. These modifiers are conventionally incorporated into the adhesive by adding the same to the adhesive formulation during the production of the adhesive. Generally speaking, tackifier extenders are substances, which may be used in conjunction with conventional tackifiers to achieve the same degree of tack at a lower concentration of the tackifier. Plasticizers are substances that improve the physical characteristics of an adhesive by making it softer and more ductile and perhaps easier to handle and apply.

Conventional hot melt adhesives typically include a base polymer composition, which may be a single polymer or a mixture of polymers, one or more plasticizers, one or more tackifiers, and perhaps other additives such as waxes, fillers, extenders, pigments, and stabilizers such as antioxidants. For example, a styrene-isoprene-styrene block copolymer may be used as a base polymer. Polyterpenes, which are usually solid, may be used as tackifiers. Mineral oils may be used as plasticizers. Conventional polybutenes may be used as combination plasticizers and tackifier extenders. Additives may include fillers such as talc or calcium carbonate, and antioxidants.

As mentioned above, the performance of hot melt adhesives may often be improved and enhanced by the incorporation therein of plasticizers and/or tackifier extenders. A conventional polybutene may often be used as both a plasticizer and a tackifier extender. Such polybutenes are simply added to the hot melt adhesive during formulation. The double bonds of these previously known conventional polybutene materials are mostly internal. That is to say, it is normal for at least about 90% of the double bonds to be at an internal position and for less than about 10% of the double bonds to be in a terminal (vinylidene) position. In addition, while the initial monomeric mixtures used to produce these conventional polybutenes may often be predominantly isobutylene, the same may also incorporates substantial quantities of monomers other than isobutylene. Thus, the conventional polybutenes that have been used as modifiers for hot melt adhesives in the past may generally be referred to as copolymers or terpolymers. For example, such conventional polybutenes often and commonly incorporate approximately 10% or so by weight of 1-butene and/or 2-butene, with only about 90% of the monomeric units in the polymer being isobutylene units.

The incorporation of conventional polybutenes into the hot melt adhesive is accomplished simply by introducing the polybutene into a vessel along with all of the other components of the hot melt adhesive formulation and heating and blending the mixture.

SUMMARY OF THE INVENTION

In accordance with one aspect of the concepts and principles of the present invention, the same provides a new and highly useful hot melt adhesive which comprises a base polymer and a modifier. The base polymer may, for example, but without limitation, be a natural rubber, a styrene-butadiene rubber, an ethylene vinyl acetate copolymer, a styrene-isoprene-styrene block copolymer, a styrene-butadiene-styrene block copolymer, or a low density polyethylene. The modifier may desirably be provided in the form of an enhanced PIB polymer product comprising a homopolymer of isobutylene wherein a predominant portion of the double bonds are in an alpha or beta position. The enhanced PIB modifier may be a tackifier extender, a plasticizer, or both, and the same may function to improve the loop tack properties of the hot melt adhesive and/or the peel adhesion properties of the hot melt adhesive. In further accordance with the preferred aspects of the invention, the enhanced PIB polymer product may desirably have a polydispersity no greater than about 2.5 and a number average molecular weight ($M_N$) that is within the range of from about 900 to about 3000, inclusive.

Preferably, in further accordance with the concepts and principles of the invention, at least about 95%, preferably at least about 96%, desirably at least about 97%, even more desirably at least about 98%, and ideally at least about 99% of the monomeric units incorporated in the PIB modifier molecules are isobutylene moieties. Even more desirably, no more than about 1% of the monomeric units incorporated in the PIB modifier molecules are something other than isobutylene moieties.

In still further accord with the concepts and principles of the invention, at least about 40%, preferably at least about 50%, even more preferably at least about 60%, desirably at least about 70%, more desirably at least about 80%, even more desirably at least about 90%, and ideally more than 90% of the double bonds of the enhanced PIB polymeric modifier of the invention may be in the alpha position. In a most preferred form of the invention, no more than about 1% of the double bonds of the enhanced PIB polymer product are in a position other than alpha or beta.

Desirably, the improved hot melt adhesives of the invention may include from at least about 5 to about 25% or more by weight of the enhanced PIB modifier.

The invention also provides a method for improving characteristics such as the loop tack and peel adhesion of a hot melt adhesive that comprises including an enhanced PIB modifier in the hot melt adhesive formulation.

DETAILED DESCRIPTION OF THE PREFERRED EMBODIMENTS

Figure 1:
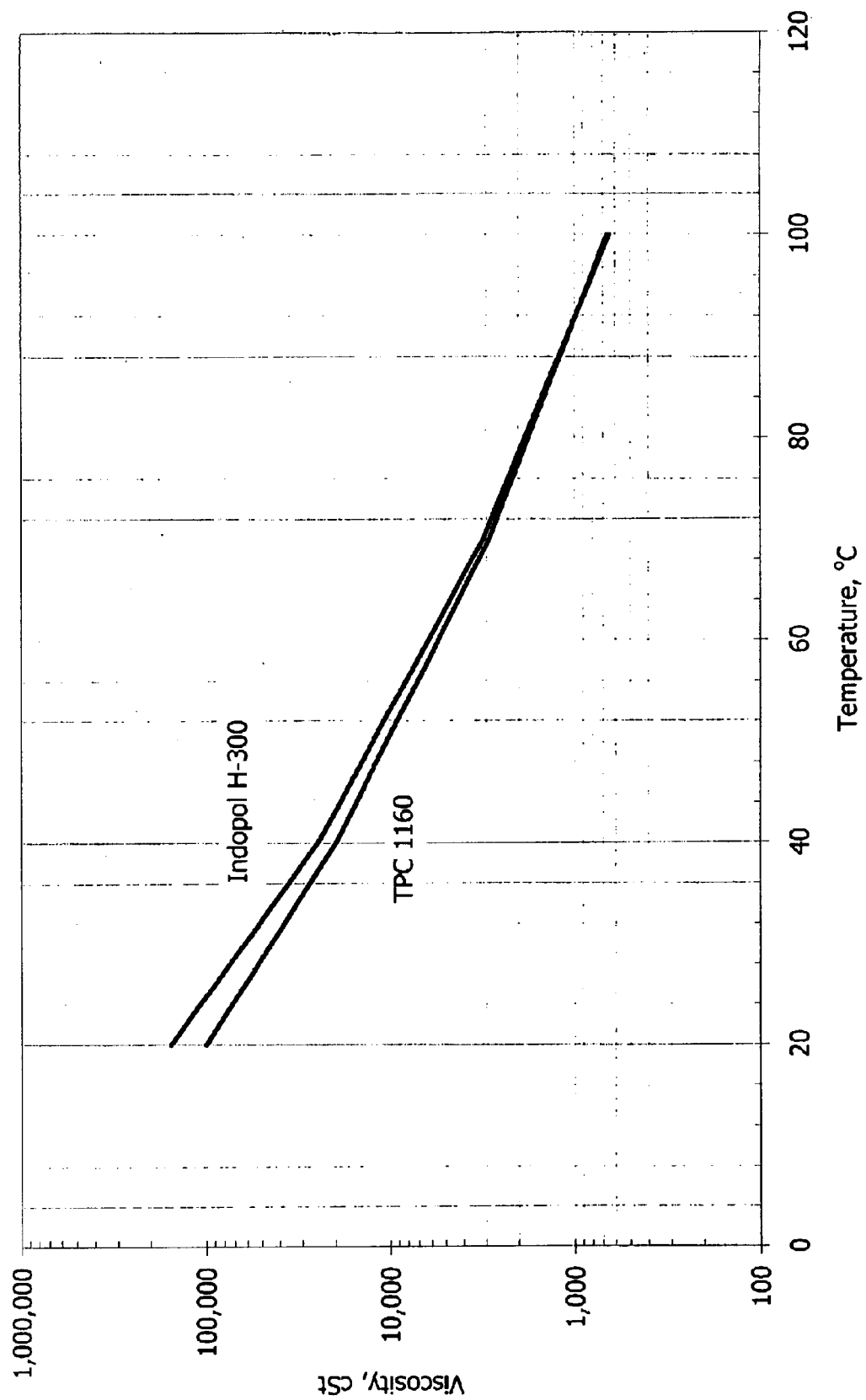
FIG. 1 is a chart comparing the viscosities of TPC 1160 and Indopol H-300 at various temperatures.

In accordance with the concepts and principles of the present invention, and as set forth above, it has been discovered that many properties, including peel adhesion and loop tack of a hot melt adhesive, can be improved, by incorporation therein, as a modifier, an enhanced PIB polymer product having a higher vinylidene (terminal double bond) content than conventional polybutenes and which is comprised essentially of a homopolymer of isobutylene wherein no more than about 5% of the monomeric units of the homopolymer comprise something other than isobutylene monomers. Enhanced PIB materials suitable for use in connection with the present invention are described in several co-pending patent applications which are owned by the owner of the present application.

Patent application Ser. No. 09/515,790 filed on Feb. 29, 2000 and entitled "Process for Producing High Vinylidene Polyisobutylene" (the "'790 application") describes a new process for the production, inter alia, of enhanced polyisobutylene (PIB) products. Some grades of enhanced PIB are referred to as high vinylidene PIB (HV-PIB) which also may sometimes be referred to as highly reactive PIB (HR-PIB). The terms HV-PIB and HR-PIB are essentially synonymous. The enhanced PIB may also sometimes be characterized by the term isobutylene homopolymer.

Patent application Ser. No. 09/665,084 filed on Sep. 20, 2000 and entitled "Process for Preparing Polyolefin Products" (the "'084 application") describes the use of the process of the '790 application for the production of polyolefins generally, including certain enhanced PIB polymer compositions. Patent application Ser. No. 10/102,279 filed Mar. 19, 2002 and entitled "Mid-Range Vinylidene Content Polyisobutylene Polymer Product and Process for Producing the Same" (the "'279 application") describes certain mid-range vinylidene containing enhanced PIB polymer compositions. The entireties of the disclosures of the '790, '084 and '279 applications are hereby incorporated into and made a part of the present disclosure by this specific reference thereto.

The number average molecular weight ($M_N$) of the enhanced PIB polymer compositions to be used as hot melt adhesive modifiers in accordance with the concepts and principles of the invention may desirably range from about 900 to about 3000. The alpha position double bond (vinylidene) content of the enhanced PIB products may desirably range from less than about 50% to more than about 90%, with the remainder of the double bonds ideally being in the beta position. Preferably, the polydispersity of the enhanced PIB product of the invention may range from about 1.2 to about 2.5, depending upon the molecular weight of the polyisobutylene. Desirably, the amount of isobutylene monomeric units incorporated in the enhanced PIB product to be used as a hot melt adhesive modifier should be at least about 95% and ideally may be about 99% or higher of the total monomeric moieties of the enhanced PIB product.

In accordance with the invention, the enhanced PIB to be used as a modifier to provide the improved hot melt adhesive of the invention may desirably and preferably be produced using the procedures described in the '790, the '084 and the '305 applications. Thus, a major and extremely important feature of the invention is simply that the enhanced PIB to be used as a hot melt adhesive modifier to provide the improved properties, including improved peel adhesion and/or loop tack, should desirably have a greater concentration of vinylidene double bonds, have a lower polydispersity, and have a higher percentage of isobutylene monomeric units than does conventional polybutene. Furthermore, the improved hot melt adhesive product of the invention may desirably include from at least about 5 to about 25% or more by weight of the enhanced PIB modifier.

COMPARATIVE EXAMPLES

To establish the effectiveness of the enhanced PIB modifiers of the invention, hot melt adhesives embodying the concepts and principles of the invention were prepared using a base polymer comprised of a linear styrene-isoprene-styrene block copolymer (Kraton D 1107), a polyterpene tackifier (Piccolyte S-115), an antioxidant (Irganox 1010), and respective selected enhanced PIB modifiers (TPC 1160 and TPC 1285). Conventional BPAmoco polybutenes (Indopol H-300 and Indopol H-1500) were used as modifiers in comparative examples employed to compare the properties of hot melt adhesives formulations produced in accordance with the concepts and principles of the invention with the properties of prior art hot melt adhesives.

Kraton D 1107 is a commercially available (Shell Chemical Company) linear styrene-isoprene-styrene block copolymer having the following properties:

| | |
|---|---|
| Specific gravity | 0.94 |
| Melt Index (200 C./5 kg) | 11 |
| Viscosity (25% in Toluene) | 1450 cps |
| Tensile Strength | 3100 psi |
| Hardness (Shore A) | 37 |
| Elongation | 1300% |
| Styrene/Rubber ratio | 15:85 |
| Plasticizer oil | 0% |

Piccolyte S-115 is a commercially available (Hercules Incorporated) pale, inert, low molecular weight, thermoplastic hydrocarbon resin that is produced from monomeric beta-terpene. It has the following typical properties:

| | |
|---|---|
| Softening point, R&B, ° C. | 115 |
| Color, Gardner | 2 |
| Bromine number | 30 |
| Density at 25° C., kg/l | 0.99 |
| Ash, % | 0.1 |
| Flashpoint, COC, ° C. | 234 |
| Melt viscosity, ° C., | |
| 1 poise | 220 |
| 10 poises | 175 |
| 100 poises | 150 |

Irganox 1010 is a commercially available (Ciba Specialty Chemicals) compound which typically is in the form of a free flowing crystalline powder. Its generic chemical name is tetrakis[methylene(3,5-di-tert-butyl-4-hydroxyhydrocinnamate)]methane, and the same has the following typical properties:

| | |
|---|---|
| Molecular Weight | 1178 |
| Specific Gravity | 1.15 |
| Melting point | 110–125° C. |

Comparative Example No. 1

In accordance with the invention, an enhanced PIB modifier was produced employing the loop reactor described in the '790 application identified above. The catalyst composition consisted of a premixed $BF_3$/methanol complex wherein the ratio of $BF_3$ to methanol was about 1:1. The reaction mixture was maintained at a temperature of from about 50 to about 60° F., and the residence time was controlled at about 120 seconds. The resultant enhanced PIB product (TPC 1160) had a number average molecular weight ($M_N$) of approximately 1600, an average alpha position double bond (vinylidene) content of about 60% and an average beta position double bond content of about 40%. That is to say, essentially all of the PIB molecules of the TPC 1160 product contained either alpha position double bonds or beta position double bonds and essentially none contained the isomeric tetra substituted double bonds. In addition, at least about 99% of the monomeric units of the enhanced TPC 1160 product were isobutylene moieties, and the polydispersity of the enhanced TPC 1160 product was about 1.4. The TPC 1160 PIB material is approximately half as viscous as conventional polybutenes such as Indopol H-300. This results in easier handling of the modifier during the formulation of hot melt adhesives.

The TPC 1160 modifier product described above was incorporated into a hot melt adhesive using standard hot melt adhesive production methodology. The formulation was as follows:

| | |
|---|---|
| Kraton D 1107 | 100 parts by weight (pbw) |
| Piccolyte S-115 | 100 pbw |
| Irganox 1010 | 1 pbw |
| TPC 1160 | 45 pbw |

For comparison purposes, a similar hot melt adhesive was prepared wherein the TPC 1160 was replaced by 45 pbw of Indopol H-300. The peel adhesion and loop tack properties of the hot melt adhesive formulation containing the TPC 1160 modifier were then compared with the same properties of the hot melt adhesive formulation containing the Indopol H-300. The results are set forth in Table I.

TABLE I

| Peel Adhesion (ASTM D 3330 A mod.) Stainless Steel, 30 min dwell, 12 in/min, lbs/in | |
|---|---|
| H-300 Formulation | 3.98 |
| TPC 1160 Formulation | 4.89 |
| Loop Tack (ASTM D 6195 B mod.) Stainless Steel, 2 in/min, lbs/in | |
| H-300 Formulation | 0.98 |
| TPC 1160 Formulation | 1.44 |

Comparative Example No. 2

In further accordance with the invention, the TPC 1285 enhanced PIB modifier was produced employing the loop reactor described in the '790 application identified above. The catalyst composition consisted of a premixed $BF_3$/methanol complex wherein the ratio of $BF_3$ to methanol was about 1:1. The reaction mixture was maintained at a temperature of from about 35 to about 45° F., and the residence time was controlled at about 120 to 180 seconds. The resultant enhanced PIB product (TPC 1285) had a number average molecular weight ($M_N$) of approximately 3000, an average alpha position double bond (vinylidene) content of about 60% and an average beta position double bond content of about 40%. That is to say, essentially all of the PIB molecules of the TPC 1285 product contained either alpha position double bonds or beta position double bonds, and essentially none of the PIB molecules contained the isomeric tetra substituted double bonds. In addition, at least about 99% of the monomeric units of the enhanced TPC 1285 product were isobutylene moieties, and the polydispersity of the enhanced TPC 1285 product was about 2.3.

The TPC 1285 modifier product described above was incorporated into a hot melt adhesive using standard hot melt adhesive production methodology. The formulation was as follows:

| | |
|---|---|
| Kraton D 1107 | 100 parts by weight (pbw) |
| Piccolyte S-115 | 100 pbw |
| Irganox 1010 | 1 pbw |
| TPC 1285 | 20 pbw |

For comparison purposes, a similar hot melt adhesive was prepared wherein the TPC 1285 was replaced by 20 pbw of Indopol H-1500. The peel adhesion and loop tack properties of the hot melt adhesive formulation containing the TPC 1285 modifier were then compared with the same properties of the hot melt adhesive formulation containing the Indopol H-1500. The results are set forth in Table II.

TABLE II

| Peel Adhesion (ASTM D 3330 A mod.) Stainless Steel, 30 min dwell, 12 in/min, lbs/in | |
|---|---|
| H-1500 Formulation | 2.34 |
| TPC 1285 Formulation | 4.38 |
| Loop Tack (ASTM D 6195 B mod.) Stainless Steel, 2 in/min, lbs/in | |
| H-1500 Formulation | 1.00 |
| TPC 1285 Formulation | 2.64 |

Figure 2:
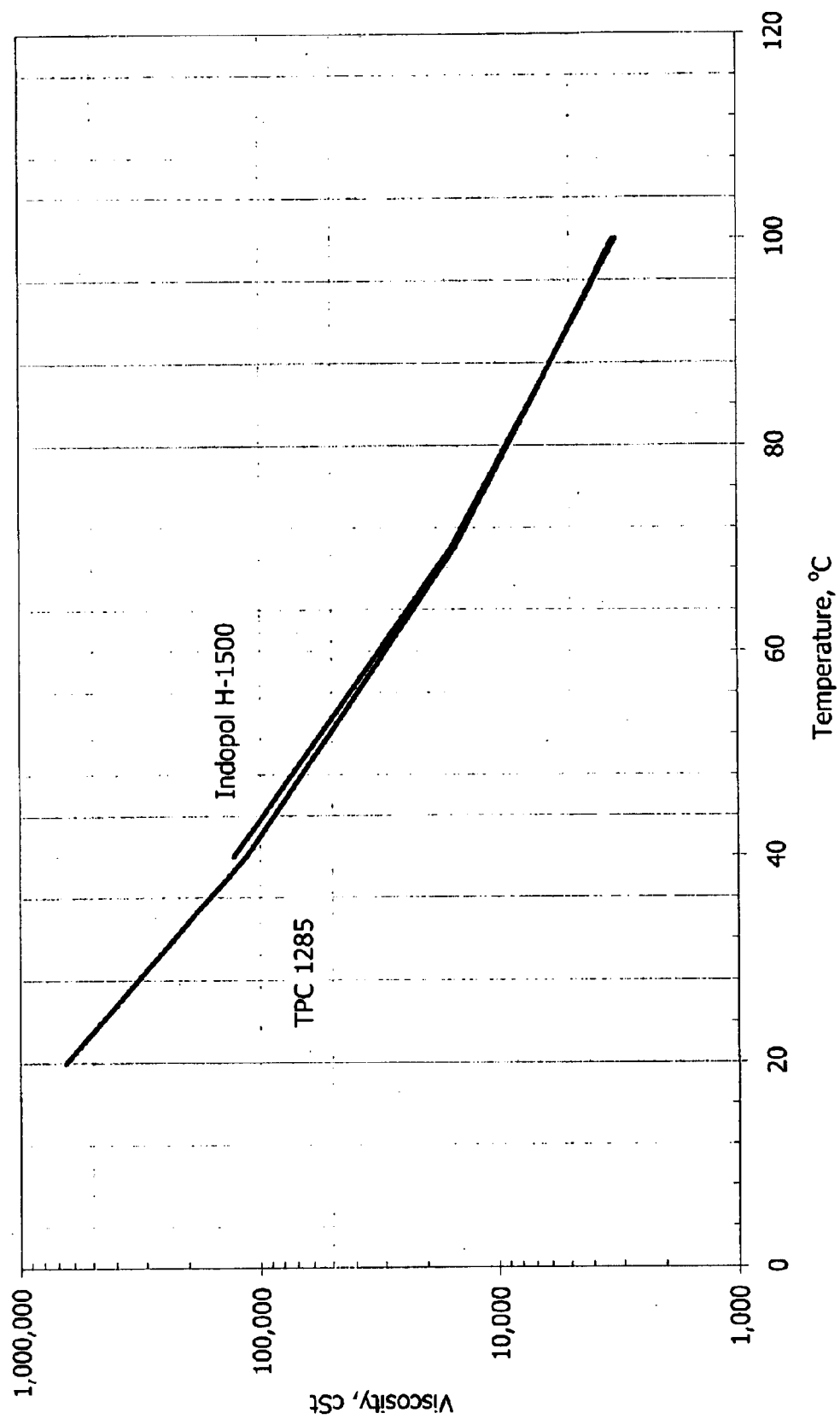
FIG. 2 is a chart comparing the viscosities of TPC 1285 and Indopol H-1500 at various temperatures.

The viscosities of TPC 1160 and Indopol H-300 are compared in FIG. 1. Similarly the viscosities of TPC 1285 and Indopol H-1500 are compared in FIG. 2. From FIGS. 1 and 2 it cam be seen that the enhanced PIB products of the invention generally have lower temperatures than do corresponding prior are polybutene modifiers.

Certain of the other Physical Properties of the TPC 1160, TPC 1285, Indopol H-300 and Indopol H-1500 modifiers used in the foregoing examples are compared in Table III.

TABLE III

Comparison of Physical Property Data for TPC 1160, TPC 1285, Indopol H-300 and Indopol H-1500

| Property | Method | TPC 1160 | TPC 1285 | Indopol H-300 | Indopol H-1500 |
|---|---|---|---|---|---|
| Molecular Weight, Mn | GPC | 1,600 | 3,000 | 1,300 | 2,300 |
| Pour Point deg C. | ASTM D97 | 3 | 12 | 9 | 15 |
| Kinematic Viscosity, cSt | ASTM D445 | | | | |
| 100 deg C. | | 662 | 3,250 | 646 | 3,172 |
| 70 deg C. | | 2,890 | 15,100 | 3,117 | 15,645 |
| 40 deg C. | | 19,800 | 114,000 | 24,760 | 128,398 |
| 20 deg C. | | 100,000 | 650,000 | 155,000 | |
| Viscosity Index | ASTM D2270 | 188 | 260 | 170 | 254 |
| Color, APHA | ASTM D1209 | 5 | 5 | 30 | 40 |
| Haze, photometric | ASTM D6181 | 0 | 1 | 0 | 1 |
| Specific Gravity @ 15.6 deg C. | ASTM D4052 | 0.903 | 0.913 | 0.902 | 0.910 |
| Flash Point, deg C. | | | | | |
| PMCC | ASTM D93 | — | 200 | 190 | 182 |
| COC | ASTM D92 | 242 | 230 | 248 | 256 |
| Chlorine, ppm | ASTM D6443 | <1 | <1 | 10 | 10 |
| Sulfur, ppm | ASTM D2622 | <1 | <1 | <1 | <1 |
| Aromatics, ppm | HPLC | <1 | <1 | <1 | <1 |
| Water, ppm | ASTM D95 | 27 | 25 | 40 | 16 |
| Acid Number | ASTM D974 | <0.1 | <0.1 | <0.1 | <0.1 |
| Saponification Number, mg KOH/g | ASTM D94 | <1.0 | <1.0 | <1.0 | <1.0 |
| Bromine Number, g/100 g | ASTM D1159 | 5 | 1.4 | 5.5 | — |
| Bromine Index, mg/100 g | ASTM D2710 | 5,200 | 1,400 | 5,500 | — |
| Evap. Loss, wt %, 10 hrs @ 99 deg C. | ASTM D992 | 0.24 | 0.10 | 0.20 | 0.10 |
| Evap. Loss, wt %, 10 hrs @ 150 deg C. | ASTM D992 | 1.7 | 0.70 | 1.7 | — |

As can be seen from the foregoing description, when the enhanced PIB modifiers of the invention are used in conjunction with hot melt adhesive formulations, the same (1) provide higher loop tack and peel adhesion due at least in part to the high purity and consistency of the enhanced PIB modifiers; and (2) provide improved handling because the same have lower viscosities at ambient conditions than conventional polybutenes.

In the preferred embodiments of the invention described above, enhanced PIB modifiers were used to improve the properties of base polymer/tackifier hot melt adhesive systems comprising a linear styrene-isoprene-styrene block copolymer base polymer and a polyterpene resin tackifier. However, the invention is not limited to these specific base polymer/tackifier hot melt adhesive systems. That is to say, the enhanced PIB modifier product of the invention is suitable for incorporation in and providing improved properties to a number of hot melt adhesive systems, wherein the base polymer may comprise, for example, but without limitation, a natural rubber, a styrene butadiene rubber, a styrene-butadiene-styrene block copolymer, a styrene-isoprene-styrene block copolymer, a low density polyethylene, an ethylene vinyl acetate copolymer, or an ethylene-butylene-isoprene block copolymer, and the tackifying resin may comprise, for example, but without limitation, a wood rosin, a gum rosin, a tall oil rosin, a terpene resin, a aromatic synthetic resin or a synthetic aliphatic resin.

Specifically, but without limitation, the enhanced PIB modifier of the present invention may be used to improve the properties of systems comprising, for example, (1) a base polymer consisting of an ethylene vinyl acetate copolymer, a natural rubber, a styrene-isoprene-styrene block copolymer, or a styrene butadiene rubber, and a pentaerythritol ester of tall oil rosin tackifier (Fortac 2100; Forchem Oy); (2) a base polymer consisting of a low density polyethylene, an ethylene vinyl acetate copolymer, a styrene-isoprene-styrene block copolymer, or a natural rubber, and a rosin ester tackifier (Uni-Tac R40; Union Camp); (3) a base polymer consisting of a styrene-isoprene-styrene block copolymer, a styrene butadiene rubber, a styrene-butadiene-styrene block copolymer, or an ethylene vinyl acetate copolymer, and a $C_5$ hydrocarbon resin tackifier (Wingtack 86; Goodyear); and (4) a base polymer consisting of a styrene-isoprene-styrene block copolymer, a styrene butadiene rubber, a natural rubber, or an ethylene vinyl acetate copolymer, and a polyterpene resin tackifier (Piccolyte A115; Hercules). Specifically, the enhanced PIB modifiers of the present invention may be used as a means for improving the properties and characteristics, including, but not necessarily limited to loop tack and/or adhesive peel, in each of the hot melt adhesive base polymer/tackifier systems identified above, as well as in each and every other hot melt adhesive base polymer/tackifier system where conventional polybutenes have been used previously as modifiers or for any other purpose. Even more so, the enhanced PIB modifiers of the present invention may be used as replacements for the conventional polybutene modifiers which have previously been used in hot melt adhesive formulations.

I claim:

1. An improved hot melt adhesive comprising a base polymer and a PIB modifier, said PIB modifier having a $M_N$ no greater than about 3000 and comprising a homopolymer of isobutylene wherein a predominant portion of the double bonds are in either an alpha position or a beta position.

2. An improved hot melt adhesive comprising a base polymer and a PIB modifier, said PIB modifier having a polydispersity no greater than about 2.5 and comprising a homopolymer of isobutylene wherein a predominant portion of the double bonds are in either an alpha position or a beta position.

3. An improved hot melt adhesive comprising a base polymer and a PIB modifier, said PIB modifier comprising a homopolymer of isobutylene wherein a predominant portion of the double bonds are in either an alpha position or a beta position, and said base polymer comprising a natural rubber, a styrene-butadiene rubber, an ethylene vinyl acetate copolymer, a styrene-isoprene-styrene block copolymer, a styrene-butadiene-styrene block copolymer, or a low density polyethylene.

4. An improved hot melt adhesive as set forth in claim 1, wherein said PIB modifier has a polydispersity no greater than about 2.5.

5. An improved hot melt adhesive as set forth in claim 4, 1 or 2, wherein said base polymer further comprises a natural rubber, a styrene-butadiene rubber, an ethylene vinyl acetate copolymer, a styrene-isoprene-styrene block copolymer, a styrene-butadiene-styrene block copolymer, or a low density polyethylene.

6. An improved hot melt adhesive as set forth in claim 4 or 1, wherein said PIB modifier has a $M_N$ which is at least about 900.

7. An improved hot melt adhesive as set forth in claim 1, 2 or 3, wherein at least about 95% of the monomeric units incorporated in the PIB modifier molecules are isobutylene moieties.

8. An improved hot melt adhesive as set forth in claim 1, 2 or 3, wherein at least about 97% of the monomeric units incorporated in the PIB modifier molecules are isobutylene moieties.

9. An improved hot melt adhesive as set forth in claim 1, 2 or 3, wherein at least about 99% of the monomeric units incorporated in the PIB modifier molecules are isobutylene moieties.

10. An improved hot melt adhesive as set forth in claim 1, 2 or 3, wherein no more than about 1% of the monomeric units incorporated in the PIB modifier molecules are something other than isobutylene moieties.

11. An improved hot melt adhesive as set forth in claim 1, 2 or 3, wherein at least about 40% of the double bonds of the PIB modifier molecules are in the alpha position.

12. An improved hot melt adhesive as set forth in claim 1, 2 or 3, wherein at least about 50% of the double bonds of the PIB modifier molecules are in the alpha position.

13. An improved hot melt adhesive as set forth in claim 1, 2 or 3, wherein at least about 60% of the double bonds of the PIB modifier are in the alpha position.

14. An improved hot melt adhesive as set forth in claim 1, 2 or 3, wherein at least about 70% of the double bonds of the PIB modifier molecules are in the alpha position.

15. An improved hot melt adhesive as set forth in claim 1, 2 or 3, wherein at least about 80% of the double bonds of the PIB modifier molecules are in the alpha position.

16. An improved hot melt adhesive as set forth in claim 1, 2 or 3, wherein at least about 90% of the double bonds of the PIB modifier molecules are in the alpha position.

17. An improved hot melt adhesive as set forth in claim 1, 2 or 3, wherein more than 90% of the double bonds of the PIP modifier molecules are in the alpha position.

18. An improved hot melt adhesive as set forth in claim 1, 2 or 3, wherein no more than about 1% of the double bonds of the PIB modifier molecules are in a position other than alpha or beta.

19. A method for improving the properties of a hot melt adhesive comprising providing a hot melt adhesive base polymer formulation and including in said base formulation a PIB modifier, said PIB modifier having a $M_N$ no greater than about 3000 and comprising a homopolymer of isobutylene wherein a predominant portion of the double bonds are in either an alpha position or a beta position.

20. A method as set forth in claim 19, wherein said PIB modifier has a polydispersity no greater than about 2.5.

21. A method for improving the properties of a hot melt adhesive comprising providing a hot melt adhesive base polymer formulation and including in said base formulation a PIB modifier, said PIB modifier having a polydispersity no greater than about 2.5 and comprising a homopolymer of isobutylene wherein a predominant portion of the double bonds are in either an alpha position or a beta position.

22. A method for improving the properties of a hot melt adhesive comprising:
providing a hot melt adhesive base polymer formulation comprising a natural rubber, a styrene-butadiene rubber, an ethylene vinyl acetate copolymer, a styrene-isoprene-styrene block copolymer, a styrene-butadiene-styrene block copolymer, or a low density polyethylene; and
including in said base formulation a PIB modifier, said PIB modifier comprising a homopolymer of isobutylene wherein a predominant portion of the double bonds are in either an alpha position or a beta position, and said base polymer.

23. A method as set forth in claim 20, 19 or 21, wherein said base polymer formulation comprises a natural rubber, a styrene-butadiene rubber, an ethylene vinyl acetate copolymer, a styrene-isoprene-styrene block copolymer, a styrene-butadiene-styrene block copolymer, or a low density polyethylene.

24. A method as set forth in claim 19, 21 or 22, wherein said PIB modifier has a $M_N$ which is at least about 900.

25. A method as set forth in claim 19, 21 or 22, wherein at least about 92% of the monomeric units incorporated in the PIB modifier molecules are isobutylene moieties.

26. A method as set forth in claim 19, 21 or 22, wherein at least about 95% of the monomeric units incorporated in the PIB modifier molecules are isobutylene moieties.

27. A method as set forth in claim 19, 21 or 22, wherein at least about 99% of the monomeric units incorporated in the PIB modifier molecules are isobutylene moieties.

28. A method as set forth in claim 19, 21 or 22, wherein no more than about 1% of the monomeric units incorporated in the PIB modifier molecules are something other than isobutylene moieties.

29. A method as set forth in claim 19, 21 or 22, wherein at least about 40% of the double bonds of the PIB modifier molecules are in the alpha position.

30. A method as set forth in claim 19, 21 or 22, wherein at least about 50% of the double bonds of the PIB modifier molecules are in the alpha position.

31. A method as set forth in claim 19, 21 or 22, wherein at least about 60% of the double bonds of the PIB modifier molecules are in the alpha position.

32. A method as set forth in claim 19, 21 or 22, wherein at least about 70% of the double bonds of the PIB modifier molecules are in the alpha position.

33. A method as set forth in claim 19, 21 or 22, wherein at least about 80% of the double bonds of the PIB modifier molecules are in the alpha position.

34. A method as set forth in claim 19, 21 or 22, wherein at least about 90% of the double bonds of the PIB modifier molecules are in the alpha position.

35. A method as set forth in claim 19, 21 or 22, wherein more than 90% of the double bonds of the PIB modifier molecules are in the alpha position.

36. A method as set forth in claim 19, 21 or 22, wherein no more than about 1% of the double bonds of the PIB modifier molecules are in a position other than the alpha or beta.

37. An improved hot melt adhesive as set forth in claim 19, 21 or 22, wherein said hot melt adhesive comprises from about 5 to about 25% by weight of said PIB modifier.

38. A method as set forth in claim 19, 21 or 22, wherein from about 5 to about 25% by weight of said PIB modifier is included in said hot melt adhesive.

39. An improved hot melt adhesive as set forth in claim 19, 21 or 22, wherein said hot melt adhesive has improved loop tack properties relative to hot melt adhesives containing conventional polybutene.

40. An improved hot melt adhesive as set forth in claim 19, 21 or 22, wherein said hot melt adhesive has improved peel adhesion properties relative to hot melt adhesives containing conventional polybutene.

41. An improved hot melt adhesive as set forth in claim 19, 21 or 22, wherein said hot melt adhesive has improved peel adhesion properties and improved loop tack properties relative to hot melt adhesives containing conventional polybutene.

* * * * *

UNITED STATES PATENT AND TRADEMARK OFFICE
CERTIFICATE OF CORRECTION

PATENT NO. : 6,930,148 B2
DATED : August 16, 2005
INVENTOR(S) : Betty L. Gipson

It is certified that error appears in the above-identified patent and that said Letters Patent is hereby corrected as shown below:

Column 2,
Line 2, delete "incorporates" and insert -- incorporate --.

Column 6,
Line 59, delete "cam" and insert -- can --.

Column 9,
Line 54, delete "PIP" and insert -- PIB --.

Column 10,
Line 19, delete "and said base polymer." and insert -- of said polymer. --.
Line 66, delete "19, 21 or 22" and insert -- 1, 2 or 3 --.

Column 11,
Lines 5 and 9, delete "19, 21 or 22" and insert -- 1, 2 or 3 --.

Column 12,
Line 4, delete "19, 21 or 22" and insert -- 1, 2 or 3 --.

Signed and Sealed this

Fourteenth Day of February, 2006

JON W. DUDAS
*Director of the United States Patent and Trademark Office*